(12) United States Patent
Van Der Woude et al.

(10) Patent No.: US 12,014,431 B2
(45) Date of Patent: Jun. 18, 2024

(54) AGRICULTURAL DEVICE FOR WORKING A FIELD

(71) Applicant: EXEL INDUSTRIES, Paris (FR)

(72) Inventors: Marten Pieter Van Der Woude, Sneek (NL); Martinus Henricus Van Alphen, Tilburg (NL)

(73) Assignee: EXEL INDUSTRIES, Paris (FR)

( * ) Notice: Subject to any disclaimer, the term of this patent is extended or adjusted under 35 U.S.C. 154(b) by 481 days.

(21) Appl. No.: 17/432,526

(22) PCT Filed: Feb. 21, 2020

(86) PCT No.: PCT/EP2020/054649
§ 371 (c)(1),
(2) Date: Aug. 20, 2021

(87) PCT Pub. No.: WO2020/169816
PCT Pub. Date: Aug. 27, 2020

(65) Prior Publication Data
US 2022/0148099 A1 May 12, 2022

(30) Foreign Application Priority Data
Feb. 21, 2019 (NL) .................................. 2022611

(51) Int. Cl.
*G06Q 50/02* (2012.01)
*A01B 79/00* (2006.01)
(52) U.S. Cl.
CPC ........... *G06Q 50/02* (2013.01); *A01B 79/005* (2013.01)

(58) Field of Classification Search
CPC ...... A01B 76/00; G06Q 50/02; G06T 11/206; G06F 16/904
See application file for complete search history.

(56) References Cited

U.S. PATENT DOCUMENTS 6,401,041 B1 * 6/2002 Petersen ............... G06T 11/206
707/E17.142
2007/0260400 A1 11/2007 Morag et al.
(Continued)

FOREIGN PATENT DOCUMENTS

WO 2017127291 A1 7/2017

OTHER PUBLICATIONS

International Search Report and Written Opinion for the International Patent Application No. PCT/EP2020/054649, dated Apr. 15, 2020, 11 pages.

*Primary Examiner* — Lam S Nguyen
(74) *Attorney, Agent, or Firm* — KDW Firm PLLC

(57) ABSTRACT

An agricultural device for working a field, a receiving system configured to receive data from an agricultural device, a system for collecting and storing agricultural data, and a method for aggregating data from an agricultural device. The agricultural device includes—a tool for working the field, a data aggregation system configured to collect a plurality of measurements at a time (T), a data processing unit, operatively connected to the data aggregation system, a memory operatively connected to the data processing unit, and a communication module operatively connected to the data processing unit. The data processing unit is configured to process each measurement from the plurality of measurements from the data aggregation system.

20 Claims, 4 Drawing Sheets

(56) References Cited

U.S. PATENT DOCUMENTS

| | | | | |
|---|---|---|---|---|
| 2013/0173321 A1* | 7/2013 | Johnson | ................ | G06Q 10/06 |
| | | | | 705/7.12 |
| 2016/0147962 A1* | 5/2016 | Vollmar | ................ | H04W 4/029 |
| | | | | 705/2 |
| 2018/0325015 A1* | 11/2018 | Wolters | ................ | B60W 10/20 |
| 2019/0050948 A1 | 2/2019 | Perry et al. | | |

* cited by examiner

AGRICULTURAL DEVICE FOR WORKING A FIELD

This is a national stage application filed under 35 U.S.C. § 371 of pending international application PCT/EP2020/054649, filed Feb. 21, 2020, which claims priority to Netherlands Patent Application No. NL 2022611, filed Feb. 21, 2019, the entirety of which applications are hereby incorporated by reference herein.

The present invention relates to a device and a method for performing activities relating to the agricultural cycle and aggregating data over time regarding the device status and the agricultural activities. The present invention is applicable in at least parts of the agricultural cycle during which data is aggregated. The agricultural cycle comprises activities relating to the growth, care after growth, and harvest of a crop, such as: working the soil, seeding, spraying fertilizer or pesticide, watering, and harvesting.

Agricultural devices for performing agricultural related activities during which data is collected are already known from practice. Such devices comprise tools for performing the related activity, for example a spraying apparatus for spraying, a plow for plowing, harvesting tools, or any other tool, and some kind of data aggregation system for collecting data related to the device and performed activities. The aggregated data may comprise data regarding the speed of the device, the position of the device and other data regarding the status of the device, such as oil pressure, fluid levels etc. The aggregated data may further comprise data relating to the agricultural activities performed such as the amount of liquid sprayed on the field or the amount of crop harvested. Data relating to actions of an operator of the device, such as steering, pressing a button, may also be comprised in the aggregated data.

Generally, the aggregated data is send to a receiving system in which it is stored and processed. The data can be used to analyze, for example, crop growth, crop yield, and effectiveness of the agriculture cycle. Furthermore, data relating to the device can be used for performance evaluation, to diagnose certain problems or might be used in a preventive or predictive maintenance setup.

Such a receiving system is often offered in a SaaS (software as a service) setup; therefore the receiving system is generally not located at the farm.

To enable an agricultural device to send data to the receiving system, the device is often equipped with a communication module such as a mobile modem configured to provide access to the receiving system via a wireless communication connection with cellular towers. In practice, using a mobile broadband connection requires a mobile broadband subscription. It is customary that a mobile broadband subscription often limits the amount of data that can be sent using the mobile broadband connection or at least charges the user of the subscription according to the amount of data sent via the mobile broadband connection. Thus, higher costs are associated with aggregating and sending more data.

Furthermore, since agricultural fields are generally located in non-urban areas, cellular tower coverage is often sparse. A sparse cellular coverage often has a negative affect on the available bandwidth of the mobile broadband connection, limiting the amount of data that can be sent over the mobile broadband connection. Since in agricultural devices it is not unusual that a large amount of data is aggregated, it is important that the bandwidth of the mobile broadband connection is high enough to be able to send the collected data with at least the same as the rate data is aggregated. Otherwise, data would be aggregated faster as it is sent, eventually resulting in an overflow of data to be sent.

To prevent high subscription cost and/or data overflow, the amount of data sent using the mobile broadband connection should be limited. This can be achieved by either limiting the types of measurements that are sent or by limiting the frequency with which measurements are sent. However, a disadvantage is that both of these solutions in some way limit the amount of data available for analyzes, by either limiting the types of measurements that are available or by lowering the measurement frequency or resolution of the available data.

When data is analyzed it is of importance that the data measurement frequency is high enough. In this context, the data measurement frequency can refer to the rate or frequency at which the measurements are recorded (e.g. the number of frames per second of a camera), or might refer to a resolution of a measurement (e.g. the number of pixels in an image). When the data measurement frequency is too low and, for example, important patterns or abnormalities exist, but have a shorter duration as the data measurement frequency, the important patterns or abnormalities can be made invisible by reducing the measurement frequency.

Furthermore, it is not always possible to predict which types of measurements will be of importance in the future. When, for example, analyzing a failure of a device, the type of measurements which are relevant to the failure depends on the type of failure. Therefore it is hard to predefine a selection of measurement types which can be consistently considered important.

Another solution could be provided by configuring the agricultural device to temporarily store the collected measurements in a memory and sending the collected measurements to the receiving system upon reaching some kind of base station, for example located at a farm, which is equipped with communication means that do not use a mobile broadband connection. However, this solution would require the construction of said base station. Furthermore, the above solution would only allow analyses of data when an agricultural device has reached its base station and has synchronized its data via the base station. Therefore it would not be possible to, for example, use data received from a malfunctioning device for diagnoses, before going to the device or returning the device to the base station.

The present invention aims to obviate or at least significantly reduce the aforementioned problems by providing an agricultural device and method for reducing data load over the mobile broadband connection.

To that end, the invention provides an agricultural device for working a field comprising:
 tools for working the field;
 a data aggregation system configured to collect a plurality of measurements at a time (T) from at least one or more of the following categories:
  velocity of the agricultural device;
  position data of the agricultural device, wherein the position can be absolute or relative to the field;
  device status data comprising data relating to the status of the agricultural device;
  process data comprising data relating to working the field;
 a data processing unit, operatively connected to the data aggregation system;
 a memory, operatively connected to the data processing unit;
 a communication module operatively connected to the data processing unit; wherein the data processing unit is configured to process each measurement from the plurality of measurements from the data aggregation system, wherein processing a measurement comprises:

establishing if the measurement confirms to at least one criterion of a set of criteria;

if the measurement confirms to at least one criterion of the set of criteria:
  at least temporarily storing the measurement in the memory;
  sending the measurement to a receiving system using the communication module;

if the measurement does not confirm to at least one criterion of the set of criteria:
  skipping the measurement;

wherein the set of criteria comprises:
the measurement has no valid preceding measurement stored in the memory;
the measurement has a valid preceding measurement stored in the memory and
  the time period between (T−1) and (T) exceeds an associated predetermined duration threshold,
  the difference between the value of the measurement and the value of the valid preceding measurement is outside an associated predetermined difference threshold, or
  the value of the measurement is in an associated key value range, and wherein the duration threshold, difference threshold and key value range comprises threshold settings stored in the memory.

It is noted that a valid preceding measurement comprises a youngest corresponding measurement collected at a time (T−1) which confirmed to the set of criteria and was stored in the memory, wherein the time (T−1) denotes the time the youngest corresponding measurement was collected by the data aggregation system.

It is further noted that initially, for example at the start of the agricultural machine, there will be no values stored in the memory, since no data has been collected yet. Alternatively, at the start of the process a default measurement can be stored in the memory, for example a speed of zero when starting the agricultural machine.

It is also noted that the set of collection criteria might also be referred to as collection criteria or criteria. Duration thresholds, difference thresholds and key values stored in the memory may also be referred to as threshold settings. Predetermined threshold settings may be referred to as preset threshold settings. Multiple preset threshold settings may be stored on the memory.

Additionally, it is noted that the set of criteria can alternatively be defined as follows, wherein the set of criteria comprises:

there is no corresponding measurement stored in the memory;
there is a preceding measurement stored in the memory, and:
  the time period between (T−1) and (T) exceeds an associated predetermined duration threshold.
  the difference between the value of the measurement and the value of the corresponding measurement stored in the memory is outside an associated predetermined difference threshold, and/or
  the value of the measurement is in an associated key value range, wherein a preceding corresponding measurement is collected by the data aggregation system at a time (T−1) and stored in the memory, and wherein the duration threshold, difference threshold and key value range comprises threshold settings stored in the memory. It will be understood by the person skilled in the art that this alternative definition of the set of criteria comprises the same set of criteria as the definition above.

It is also noted that measurement collected by the data aggregation system are collected from various sensors and other means for producing measurement, such as for example speed sensors, GPS (Global Positioning System), oil pressure sensors, fluid flow rate sensors, crop yield sensors, camera's, etc.

It is further noted that fluid rate sensors may measure the type of liquid that is sprayed and/or the amount of liquid that is sprayed.

The various sensors might for example also measure plant characteristics, such as: plant size, plant type, plant grow stage, number of plants detected, plant health, and other plant characteristics.

Further it is noted that process data comprises data relating to working the field, such as sensor data, actuator data, and operator data (e.g. when an operator presses a button).

It is also noted that the communication module is configured to connect to and send data to a receiving system. A communication module may comprise a mobile broadband modem, a narrow band IoT module, or any other communication technique which can be used to send and receive data.

An advantage of the agricultural device according to the invention is that data is only send to the receiving system when one or more of the mentioned criteria are met. By only sending data to the receiving system when one or more of the mentioned criteria are met, sending redundant data is avoided, reducing the data to be sent via the mobile broadband connection. This achieves both a reduction in total amount of data sent and the amount of bandwidth necessary for sending the data. Additionally, the criteria ensure that significant changes in the data are sent to the collecting system.

The duration threshold criterion ensures that a measurement is send to the receiving system at least every time the duration threshold is exceeded. Introducing the duration threshold has the advantage that it is possible to differentiate for example a malfunctioning sensor, e.g. a sensor which is no longer taking measurements, from a sensor which measurements are within the difference threshold for an extended period of time.

The difference threshold criterion ensures that measurements are only sent to the receiving system when the change in measurement value exceeds the threshold. This has as advantage that constant measurements or measurements with small fluctuations are not sent. This reduces the total amount of data that is sent via the mobile broadband connection, without the need to lower the data measurement frequency.

The key value criterion ensures that some measurements are always sent to the receiving system, even if they would normally fall within the difference threshold. This has as advantage, that when the key value has an important meaning attached, this value is always registered in the receiving system. An example is the speed of the vehicle. A device standing still, and thus having a speed of zero, is different as a device which is moving (very) slowly. In context the difference between standing still and moving slowly might be of importance when analyzing the data, while the difference in speed might fall within the difference threshold and would therefore not be recorded without setting the key value criterion for speed to aero.

Another advantage of the agricultural device according to the invention is that measurements can have associated predetermined threshold settings. Therefore, a measurement can have associated threshold settings specifically adapted for the nature of that measurement. This makes the data processing unit suitable for a large variety of measurements. e.g. a measurement fluctuating between zero and hundred would have different associated threshold settings as a measurement fluctuating between zero and one.

In an embodiment, the set of collection criteria further comprises the preceding measurement at time (T−1) has reached a predetermined key value range and the measurement value at time (T) is not in the predetermined key value range.

In an embodiment the agricultural device further comprises a display and input controls, wherein the display is configured to display information about the data aggregation system and threshold settings; and wherein the input controls are configured to allow a user to adjust the threshold settings.

The input controls may be integrated in the display in the form of a touch sensitive display or may be embodied by a keyboard, keypad, dials and/or other input means known from practice.

By equipping the agricultural device with the display and the input controls as disclosed above, a user is able to configure view and configure the threshold settings if deemed necessary. This has as advantage that it is easy for the user to switch between different settings according the work that is performed. For example, when switching between working a first field with a first crop and working a second field with a second crop, the user is able to adapt the threshold settings in between the two fields. This allows the user to tweak the threshold settings corresponding to his considerations regarding the fields, type of crops etc.

In another embodiment the data processing unit is further configured to select a preset threshold setting from a group of preset threshold settings based on a unit of measurement of the measurement.

By relating the threshold settings with the respective units of measurements, it is possible to adapt settings of a group of measurements at once, making it quicker and easier to change these settings.

In an embodiment according to the invention the difference thresholds comprises a percentage of change between the value of the measurement at time (T) and the value of the corresponding measurement at (T−1). By expressing the difference thresholds as a percentage of change, the threshold is automatically adapted to the magnitude of the measurement value. This is advantageous when, for example, a small difference is considered significant when the measurement has a small magnitude, but is considered insignificant for large magnitudes.

In another advantageous embodiment according to the invention, the data processing unit is further configured to select a preset threshold setting from a group of preset threshold settings based on the type of plant variety. In a preferred embodiment the display and input controls are configured to select the type of plant variety and select presets threshold settings accordingly.

By determining the threshold settings according to the type of plant variety it is possible to easily switch between presets of settings according to the type of plant variety of the crop. This is for example important when a certain crop is more sensitive to a certain liquid being sprayed compared to other crops, and the farmer wishes to have more detailed information on the flow rate of the liquid. In this case the farmer can easily switch to a predetermined threshold setting in which the flow rate of the liquid has a lower threshold.

In another embodiment the processing unit is further configured to select a preset threshold setting from a group of preset threshold settings based on the growth stage of the crop. By determining the threshold settings according to the growth stage of the plant, the threshold settings are easily adapted accordingly. This is advantageous when a farmer considers certain measurements to be more important in different growth stages.

In a preferred embodiment the display and input controls are configured to display and select the crop type and/or growth stage of the plant and select presets threshold settings accordingly. This allows users to easily switch between different threshold settings based on the situation.

In a further advantageous embodiment the threshold settings are further determined by the data processing unit based on environmental factors comprising one or more of soil types, soil moisture levels, and/or weather conditions. This allows for further optimization of the threshold settings.

In another embodiment wherein the data processing unit is further configured to dynamically adjust the threshold settings based on the amount of bandwidth available via the mobile broadband connection, wherein dynamically adjusting comprises lowering the difference thresholds and duration thresholds when more bandwidth is available and increasing the difference thresholds and duration thresholds when less bandwidth is available.

When a measurement is skipped (and thus not sent) some details about the measurement are lost, since the measurement can have any value in the range defined by the last sent corresponding measurement plus or minus the difference threshold. By dynamically adjusting the threshold settings based on the amount of bandwidth available via the mobile broadband connection, a maximum possible amount of detail in the collected data is maintained considering the amount of bandwidth is available. This means the detail of the data is only reduced lowered when the bandwidth is insufficient.

In an embodiment according to the invention the data processing unit is further configured to represent numeric values, such as a quantity of liquid, using a range index, wherein the range index is a natural number taken from a range of N index numbers between zero and N−1 wherein:

each index number is associated with a distinct block (or range) of numeric values;
range index zero corresponds to a predetermined block of lowest numeric values;
range index N−1 corresponds to a predetermined block of highest numeric values;
the range index associated with a numeric value corresponds to the range index of the block the numeric value falls into; and,
each type of numeric measurement has an associated predetermined range stored in the memory.

By representing the numeric value of a measurement using a range index instead of using the numeric value directly, the amount of bandwidth/storage needed is reduced when sending/storing the measurement, since the numbers of bits needed to represent the quantity in the memory is equal to the number of bits needed to represent the number N−1 (as opposed to using a floating point number or an integer based representation).

According to an embodiment of the invention the receiving system configured to receive data from an agricultural device comprises a processor, a memory operatively connected to the processor and a communication module operatively connected to the processor, wherein the communication module of the receiving system is configured to connect to the communication module of the agricultural device and receive measurements from the agricultural device; and wherein the processor is configured to store the measurements received by the communication unit in the memory with the time (T) as a timestamp.

In an advantageous embodiment the receiving system is further configured to:
if an element is in the memory for a time (T−1) and when a corresponding element lacks in the received measurements collected at time (T), repeating the element in the memory with timestamp (T).

By repeating an element which is not received by the receiving system, the measurement sequence as collected by the aggregation unit of the agricultural machine is restored with a given error margin, wherein the error margin is determined by the difference threshold.

In an embodiment the data processing unit is further configured to send a collection of measurements that comply with the criteria to the receiving system using the communication unit at a pre-defined interval.

In an advantageous embodiment the pre-defined interval is in the range of 1-3 seconds, and is preferably about 2 seconds.

By sending the collection of measurements at a pre-defined interval, the receiving system can determine when a collection of measurements is expected to be received and can use this information for the repetition of not-received measurements in the memory and determining the correct time (T) for the repeated measurements.

In another embodiment the invention relates to a system for collecting and storing agricultural data, comprising an agricultural device and a receiving system according to any of the above embodiments or a combination of the above embodiments.

The invention further relates to a method for equipping an agricultural device with means for aggregating and processing data such that the device comprises the agricultural device according to the invention as disclosed above or any combination of disclosed embodiments, the method comprising installing
- a data aggregation system;
- a data processing unit, operatively connected to the data aggregation system;
- a memory, operatively connected to the data processing unit;
- a communication module comprising a mobile broadband modem;
- and, configuring the agricultural device according to any of the embodiments above.

The above method allows the invention to be backwards compatible with existing equipment. This has as advantage that existing equipment, which do not comprises a data aggregation system and/or a data processing unit as described above, can be upgraded to an agricultural device according to the invention. By upgrading existing agricultural devices, an agricultural device according to the invention can be obtained with reduced costs.

The invention further relates to a method for aggregating data from an agricultural device, the method comprising:
collecting a plurality of measurements at a time (T) from at least one or more of the following categories:
velocity of the agricultural device;
position data of the agricultural device, wherein the position can be absolute or relative to the field;
device status data comprising data relating to the status of the agricultural device;
process data comprising data relating to working the field;
processing each measurement from the plurality of measurements from the data aggregation system, wherein processing a measurement comprises:
establishing if the measurement confirms to a set of criteria;
if the measurement confirms to the set of criteria:
at least temporarily storing the measurement in a memory;
sending the measurement to a collecting system using the communication module;
if the measurement does not confirm to the set of criteria:
skipping the measurement;
wherein the set of criteria comprises:
the measurement has no valid preceding measurement, wherein a valid preceding measurement comprises a youngest corresponding measurement collected at a time (T−1) which confirmed to the set of criteria and was stored in the memory, wherein the time (T−1) denotes the time the youngest corresponding measurement was collected by the data aggregation system;
the measurement has a valid preceding measurement and
the time period between (T−1) and (T) exceeds an associated predetermined duration threshold,
the difference between the value of the measurement and the value of the valid preceding measurement is outside an associated predetermined difference threshold, or
the value of the measurement is in an associated key value range, and
wherein the duration threshold, difference threshold and key value range comprises threshold settings stored in the memory.

The invention further relates to a sending system, which is configured to send data or measurement to the agricultural device, similar to the data processing unit of the agricultural device, and wherein the agricultural device is further configured to receive, store and use said data.

The invention is described in the foregoing as example. It is understood that those skilled in the art are capable of realizing different variants of the invention without actually departing from the scope of the invention. Further advantages, features and details of the invention are elucidated on the basis of preferred embodiments thereof, wherein reference is made to the accompanying drawings, in which.

Figure 1A:
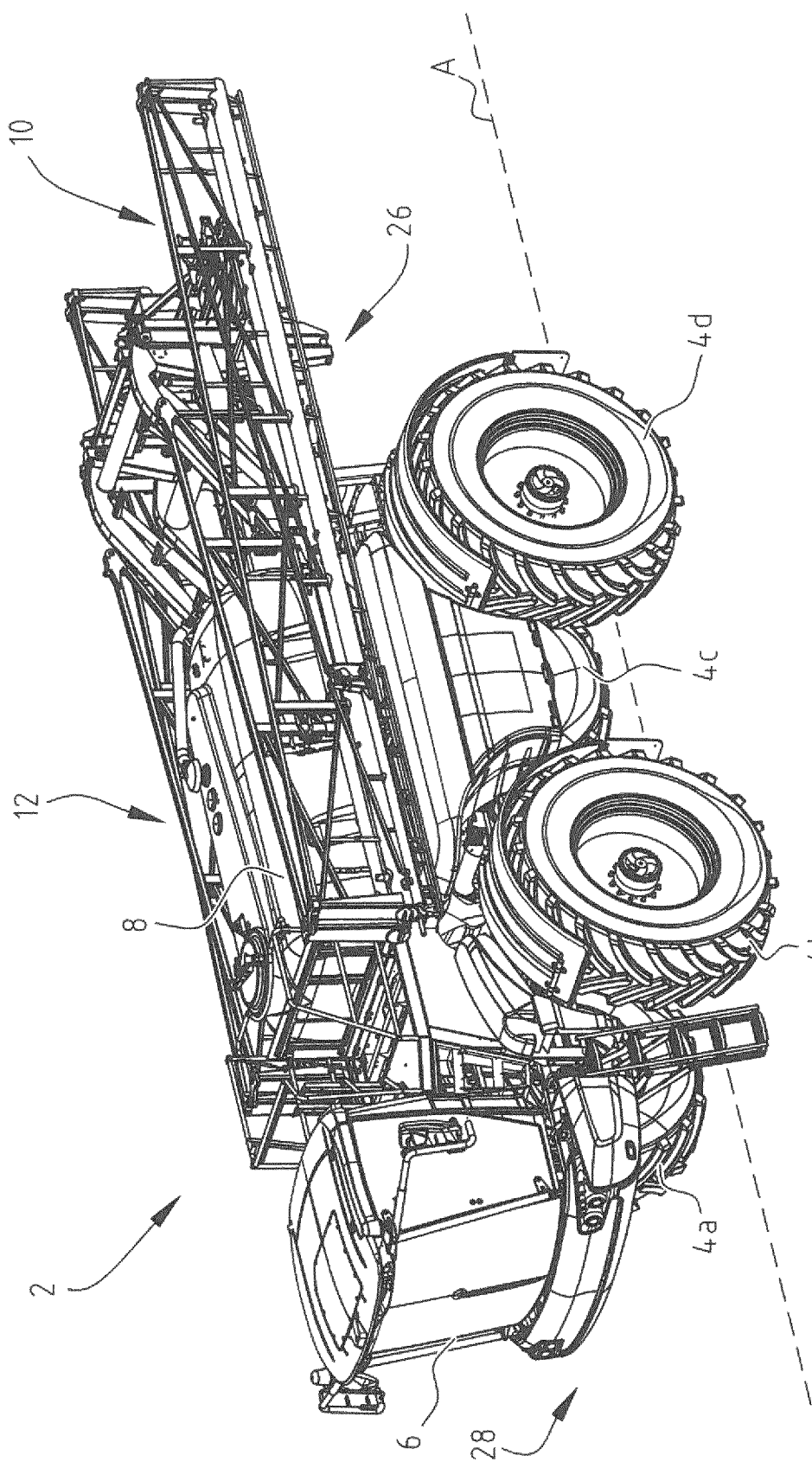
FIG. 1a shows a perspective view of an example of an agricultural device according to the invention.

Agricultural device 2 according to an example of the invention (see FIGS. 1a, 1b) shows self-propelled device 2 that is provided with wheels 4a, 4b, 4c, 4d that are connected to a drive assembly (not shown) and with driver cabin 6 from which an operator can control agricultural device 2. Agricultural device 2 further comprises liquid product supply 8 in the form of storage tank 8 in which liquid product that is to be dispensed over a surface is provided. In this example, agricultural device 2 comprises two booms 10, 12. Boom 10 is provided with longitudinal supply line 14 and a plurality of nozzles 18a-18x which are distributed along boom 10. Each of the nozzles 18a-18x is fluidly connected with longitudinal supply line 14 of boom 10, which longitudinal supply line 14 has end portion 22 that is fluidly connected with liquid product supply 8.

Boom 12 is provided with longitudinal supply line 16 and a plurality of nozzles 20a-20x which are distributed along boom 12. Each of the nozzles 20a-20x is fluidly connected with longitudinal supply line 16 of boom 12, which longitudinal supply line 16 has end portion 24 that is fluidly connected with liquid product supply 8.

Figure 1B:
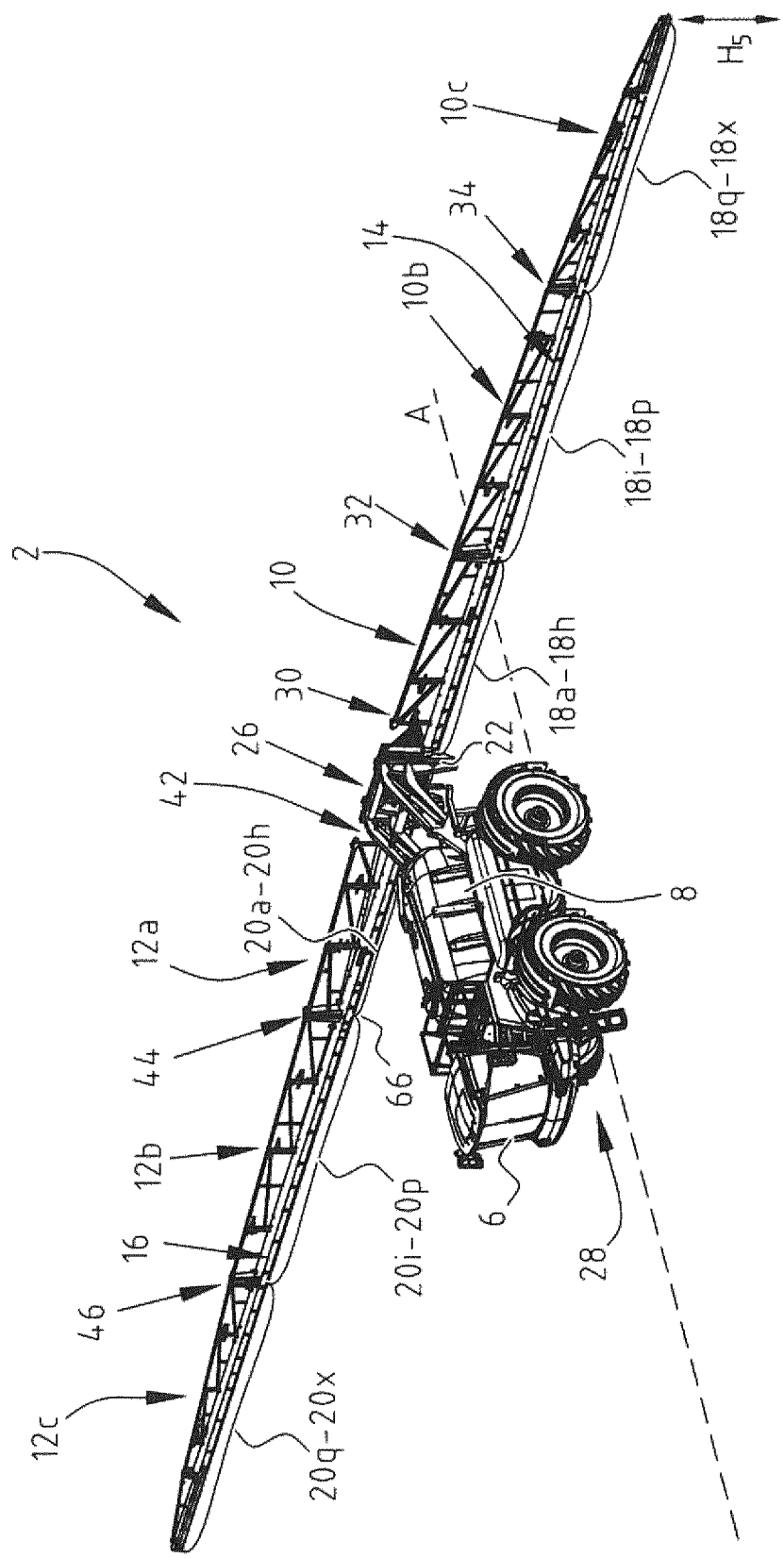
FIG. 1b shows the device of FIG. 1 in which the booms are extended.
Figure 2:
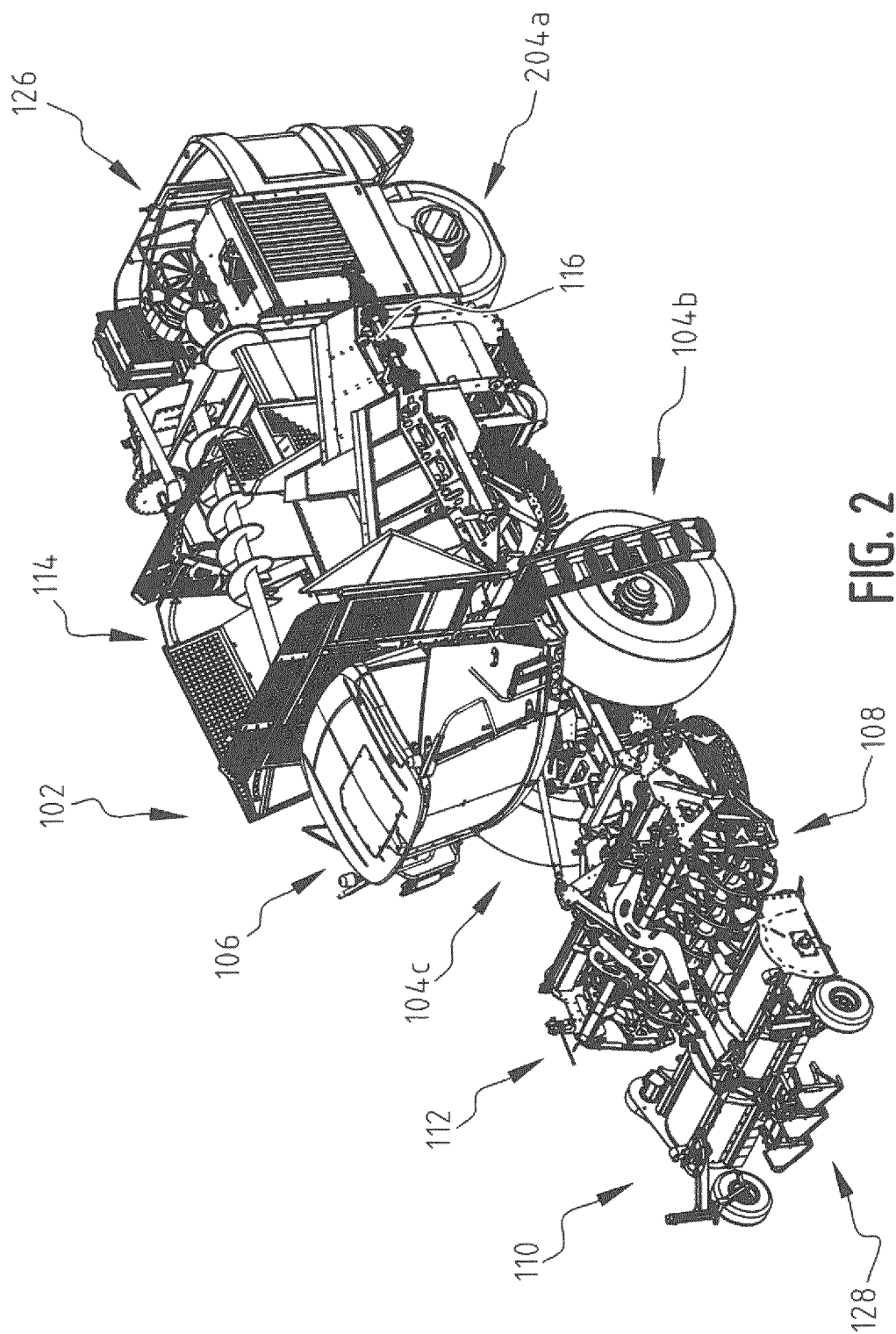
FIG. 2 shows a perspective view of an example of a second device according to the invention.
Figure 3:
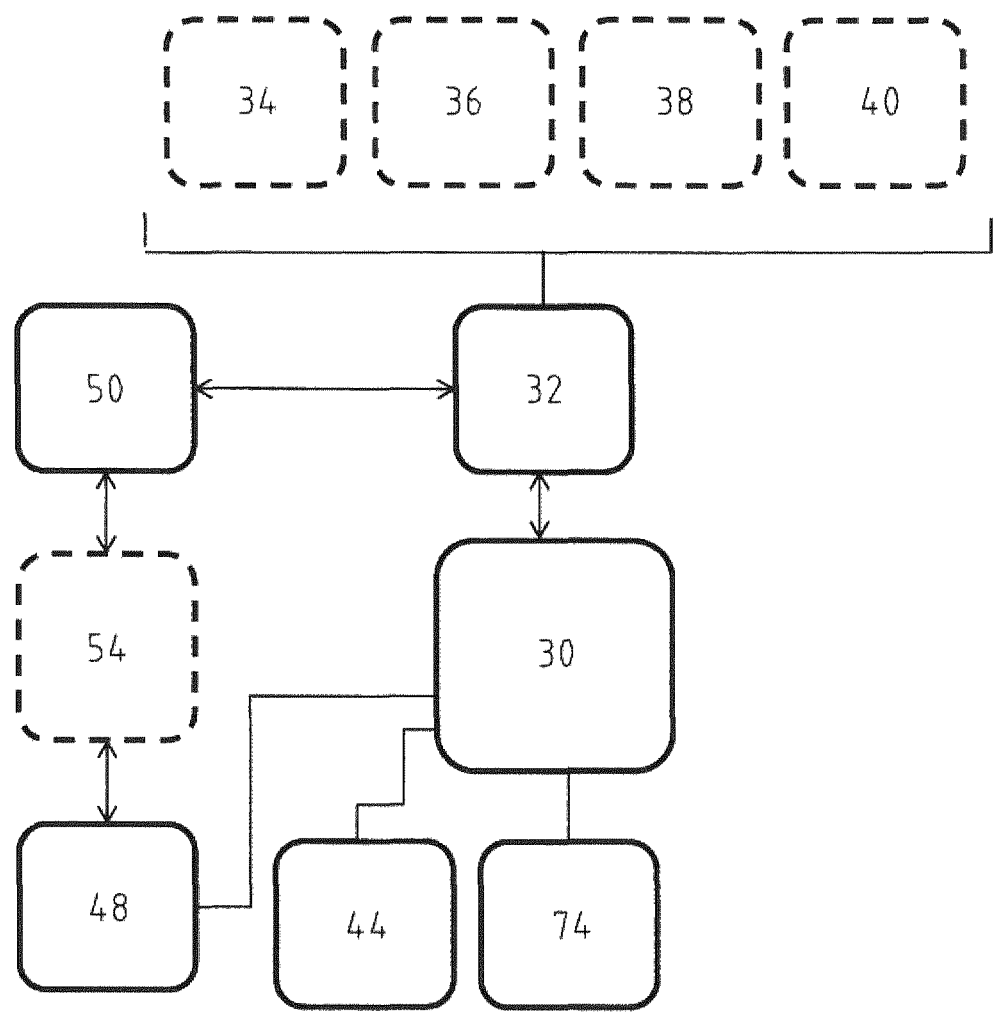
FIG. 3 shows a schematic overview of components of a device according to the invention.

In this example, booms 10, 12 each are foldable between a storage position (see FIG. 1a) and a spray position (see FIG. 1b). In the active position, booms 10, 12 extend outwardly on opposite sides from the agricultural device 2 (see FIG. 1b). In this position, booms 10, 12 extend substantially perpendicular to a central axis A, which central axis A extends substantially parallel to moving direction D from rear end 26 to front end 28 of device 2. In the storage position, each of booms 10, 12 is rotated inwardly over an angle of about 90° and folded, such that each of booms 10, 12 extends at least partially parallel to central axis A of agricultural device 2 (see FIG. 1a).

Agricultural device 2 further comprises pressure regulation means 54, which include at least one nozzle control units 56 to control the opening and closing of one or more of associated nozzles 18a-18x, 20a-20x on respective booms 10, 12.

In a second example of device 102 according to the invention, device 102 comprises crop collecting device 102 having three wheels 204a, 104b, 104c, of which front wheels 104a, 104b are driven wheels. An operator can operate device 102 from driver cabin 106, from which he has a good view on field working assembly 108, comprising components 110, 112 for collecting crops. Collected crops are at least temporarily stored in store 114, from which they are expelled via exit 116. Device 102 has rear end 126 and front end 128, which also defines its principal travelling direction D.

Devices 2, 102 in these examples contain data aggregation system 32 that collects measurement data 34, 36, 38, 40, which in this case are velocity 34 of device 2, 102, position data 36 of device 2, 102, device state data 38 of device 2, 102 relating to the status of device 2, 102 and process data 40 relating to the field that is currently worked. In case of device 2 process data 40 can comprise the amount of liquid sprayed. In case of device 102 process data 40 can comprise the amount of crop harvested.

Data aggregation system 32 forwards measurement data 34, 36, 38, 40 to data processing unit 30, which is also connected to various other components, including memory 74 for storing, inter alia, measurement data 34, 36, 38, 40. Furthermore, memory 74 may contain software that can be operated by data processing unit 30. Data processing unit 30 is further connected to communication system 44, which is configured to communicate data with a remote system (not shown) based on a data reduction principle according to the invention.

Furthermore, display 50 and input controls 48 are part of device 2, 102 to provide input by an operator (input controls 48) and receive feedback (display 50). Both display 50 and input controls 48 are operatively connected data processing unit 30. Input controls 48 are further configured to enable an operator to provide threshold settings 52 to data processing unit 30, which are consecutively displayed on display 50.

In order to elaborate on the different modes and use of device 2, 102 according to the invention, some examples are given below.

In an example of the invention the agricultural device comprises a self propelling spraying device in which the process data collected by the data aggregation system comprises the quantity of liquid sprayed on the field registered in milliliters for times T=1 to T=4. The data processing unit is configured to use a predetermined different threshold of 5 milliliters for said measurements. In the table below a sequence of measurements is given, indicating their value, whether or not the measurement is sent by the communication module. For added clarity a difference threshold range is also displayed in the table such that it is easy to see when the difference between the value of the measurement and the value of the valid preceding measurement is outside an the predetermined difference threshold. The measurement at T=1 is sent since it is the first measurement in the sequence and thus has no valid preceding measurement. The measurement at T=2 is sent since the value is outside the difference threshold range. The measurement at T=3 is not sent, since it is in the range 505-515. The measurement at T=4 is sent since it outside the range 505-515.

| Time T | Quantity (ml) | Sent | Threshold Range |
| --- | --- | --- | --- |
| 1 | 500 | Yes | 495-505 |
| 2 | 510 | Yes | 505-515 |
| 3 | 505 | No | |
| 4 | 504 | Yes | 499-509 |

In another example of the invention the speed of the agricultural device is registered in kilometers an hour, using a predetermined difference threshold of 1 km/h and a key value of 0 km/h. The measurement at T=1 is sent since it is the first measurement. The measurement at T=2 is not sent since it falls within the threshold range (10-12). The measurement at T=3 is sent since it falls outside the threshold range 10-12. While the measurement at T=4 does fall in the threshold range (0-2), it is still sent since 0 is a key-value.

| Time T | Speed (km/h) | Sent | Threshold range |
| --- | --- | --- | --- |
| 1 | 11 | Yes | 10-12 |
| 2 | 10 | No | |
| 3 | 1 | Yes | 0-2 |
| 4 | 0 | Yes | −1-1 |

The present invention is by no means limited to the above described preferred embodiments thereof. The rights sought are defined by the following clauses within the scope of which many modifications can be envisaged.

The invention claimed is:
1. An agricultural device for working a field comprising:
a tool for working the field;
a data aggregation system configured to collect a plurality of measurements at a time (T) from at least one or more of the following categories:
velocity of the agricultural device;
position data of the agricultural device, wherein the position can be absolute or relative to the field;
device state data comprising data relating to the status of the agricultural device; and process data comprising data relating to working the field;
a data processing unit operatively connected to the data aggregation system;
a memory operatively connected to the data processing unit; and
a communication module operatively connected to the data processing unit;
wherein the data processing unit is configured to process each measurement from the plurality of measurements from the data aggregation system, wherein processing a measurement comprises:
establishing if the measurement confirms to at least one criterion of a set of criteria;
if the measurement confirms to at least one criterion of the set of criteria:
  at least temporarily storing the measurement in the memory; and
  sending the measurement to a receiving system using the communication module;
if the measurement does not confirm to at least one criterion of the set of criteria:
  skipping the measurement;
wherein the set of criteria comprises:
the measurement has no valid preceding measurement, wherein a valid preceding measurement comprises a youngest corresponding measurement collected at a time (T−1) which confirmed to the set of criteria and was stored in the memory, wherein the time (T−1) denotes the time the youngest corresponding measurement was collected by the data aggregation system;
the measurement has a valid preceding measurement and the time period between (T−1) and (T) exceeds an associated predetermined duration threshold,
  the difference between the value of the measurement and the value of the valid preceding measurement is outside an associated predetermined difference threshold, or
  the value of the measurement is in an associated key value range; and
wherein the duration threshold, difference threshold and key value range comprise threshold settings stored in the memory.

2. The agricultural device according to claim 1, further comprising a display and input controls, wherein the display is configured to display information about the data aggregation system and threshold settings; and wherein the input controls are configured to allow a user to adjust the threshold settings.

3. The agricultural device according to claim 1, wherein the data processing unit is further configured to select a preset threshold setting from a group of preset threshold settings based on a unit of measurement of the measurement.

4. The agricultural device according to claim 1, wherein the difference thresholds comprise a percentage of change between the value of the measurement at time (T) and the value of the valid preceding measurement at time (T−1).

5. The agricultural device according to claim 1, wherein the data processing unit is further configured to select a preset threshold setting from a group of preset threshold settings based on the type of plant variety.

6. The agricultural device according to claim 5, wherein the display is further configured for displaying a plant variety and/or growth stadium and wherein the input controls are configured to allow a user to select a plant variety and/or growth stadium.

7. The agricultural device according to claim 1, wherein the data processing unit is further configured to select a preset threshold setting from a group of preset threshold settings based on the growth stage of the crop.

8. The agricultural device according to claim 7, wherein the display is further configured for displaying a plant variety and/or growth stadium and wherein the input controls are configured to allow a user to select a plant variety and/or growth stadium.

9. The agricultural device according to claim 8, wherein the difference thresholds comprises a percentage of change between the value of the measurement at time (T) and the value of the valid preceding measurement at time (T−1).

10. The agricultural device according to claim 9, wherein the data processing unit is further configured to dynamically adjust the thresholds settings based on the amount of bandwidth available via the communication module, wherein dynamically adjusting comprises lowering the difference thresholds and duration thresholds when more bandwidth is available and increasing the difference thresholds and duration thresholds when less bandwidth is available.

11. The agricultural device according to claim 10, wherein the display is further configured for displaying a plant variety and/or growth stadium and wherein the input controls are configured to allow a user to select a plant variety and/or growth stadium.

12. The agricultural device according to claim 1, wherein threshold settings are further determined by the data processing unit based on environmental factors comprising one or more of soil types, soil moisture levels, and/or weather conditions.

13. The agricultural device according to claim 1, wherein the data processing unit is further configured to dynamically adjust the thresholds settings based on an amount of bandwidth available via the communication module, wherein dynamically adjusting comprises lowering the difference thresholds and duration thresholds when more bandwidth is available and increasing the difference thresholds and duration thresholds when less bandwidth is available.

14. The agricultural device according to claim 1, wherein the data processing unit is further configured to send a collection of measurements that comply with the criteria to the receiving system using the communication unit at a pre-defined interval.

15. The agricultural device according to claim 14, wherein the pre-defined interval is in the range of 1-3 seconds.

16. The agricultural device according to claim 1, wherein the agricultural device is an agricultural spraying device wherein the tools for working the field comprises means for spraying a liquid on the field, and the processing data category comprises a flow rate at which the liquid is sprayed.

17. The agricultural device according to claim 1, wherein the data processing unit is further configured to represent numeric values, such as a quantity of liquid, using a range index, wherein the range index is a natural number taken from a range of N index numbers between zero and N−1 wherein:
  each index number is associated with a distinct block (or range) of numeric values;
  range index zero corresponds to a predetermined block of lowest numeric values;
  range index N−1 corresponds to a predetermined block of highest numeric values;
  the range index associated with a numeric value corresponds to the range index of the block the numeric value falls into; and, each type of numeric measurement has an associated predetermined range stored in the memory.

18. A system for collecting and storing agricultural data, comprising an agricultural device according to claim 1 and a receiving system configured to receive data from the agricultural device, wherein the receiving system comprises a processor, a memory operatively connected to processor and a communication module operatively connected to the processor, wherein the communication module of the receiving system is configured to connect to the communication module of the agricultural device and receive measurements from the agricultural device; and wherein the processor is configured to store the measurements received by the communication unit in the memory with the time (T) as a timestamp.

19. The system according to claim 18, wherein the receiving system is further configured to:
  if an element is in the memory for a time (T−1) and when a corresponding element lacks in the received measurements collected at time (T), repeat the element in the memory with timestamp (T).

20. A method for aggregating data from an agricultural device, the method comprising:
  collecting a plurality of measurement at a time (T) from at least one or more of the following categories:
    velocity of the agricultural device;
    position data of the agricultural device, wherein the position can be absolute or relative to the field;
    device status data comprising data relating to the status of the agricultural device;
    process data comprising data relating to working the field;
  processing each measurement from the plurality of measurements from the data aggregation system, wherein processing a measurement comprises:
    establishing if the measurement confirms to a set of criteria;
    if the measurement confirms to the set of criteria:
      at least temporarily storing the measurement in the memory;
      sending the measurement to a collecting system using the communication module;
    if the measurement does not confirm to the set of criteria:
      skipping the measurement;
  wherein the set of criteria comprises:
    the measurement has no preceding measurement;
    the measurement has a valid preceding measurement, wherein a valid preceding measurement comprises a youngest corresponding measurement collected at a time (T−1) which confirmed to the set of criteria and was stored in the memory, wherein the time (T−1) denotes the time the youngest corresponding measurement was collected by the data aggregation system, and
      the time period between (T−1) and (T) exceeds an associated predetermined duration threshold,
      the difference between the value of the measurement and the value of the valid preceding measurement is outside an associated predetermined difference threshold, or
      the value of the measurement is in an associated key value range, and wherein the duration threshold, difference threshold and key value range comprise threshold settings stored in the memory.

* * * * *